Dec. 7, 1948.　　　　　J. H. SHERTS　　　2,455,818
GLARE REDUCING REAR VISION MIRROR
Filed March 6, 1945　　　　　　　　　　　3 Sheets-Sheet 1
Fig. 1.
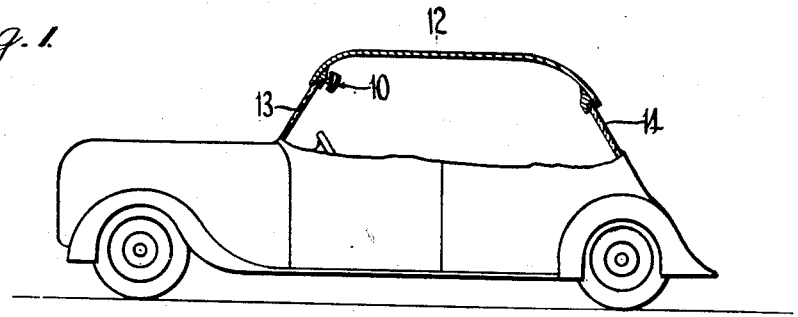
Fig. 4.
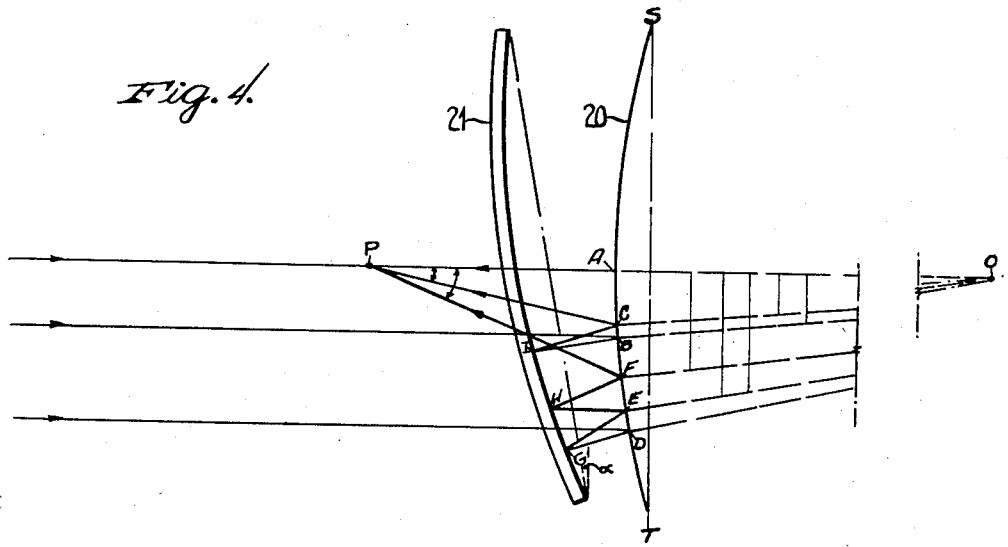
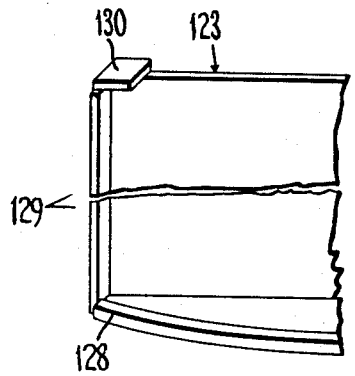
Fig. 8.
Inventor
JAMES H. SHERTS
By Olen E. Bee
Attorney Dec. 7, 1948.　　　J. H. SHERTS　　　2,455,818
GLARE REDUCING REAR VISION MIRROR Filed March 6, 1945　　　3 Sheets-Sheet 2

Inventor
JAMES H. SHERTS

By Olen E Bee
Attorney

Dec. 7, 1948.  J. H. SHERTS  2,455,818
GLARE REDUCING REAR VISION MIRROR
Filed March 6, 1945  3 Sheets-Sheet 3
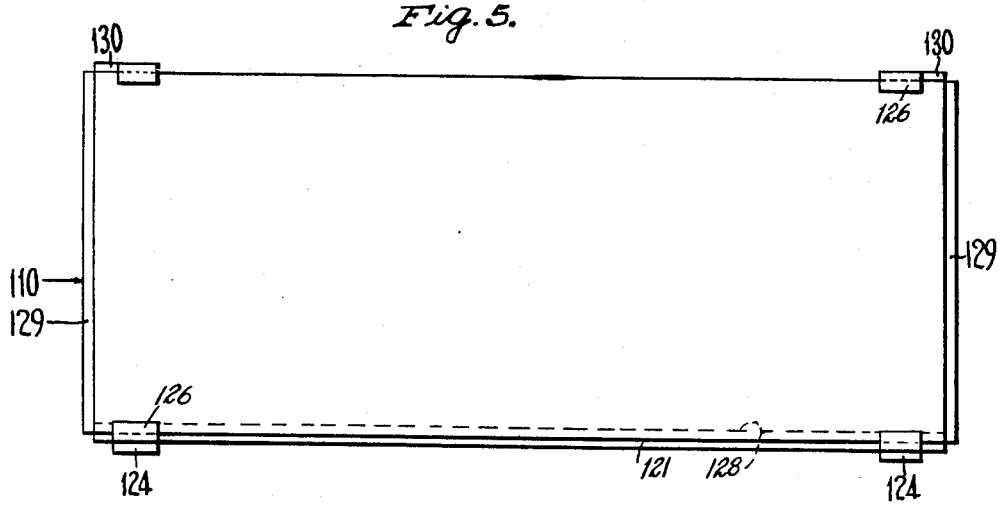
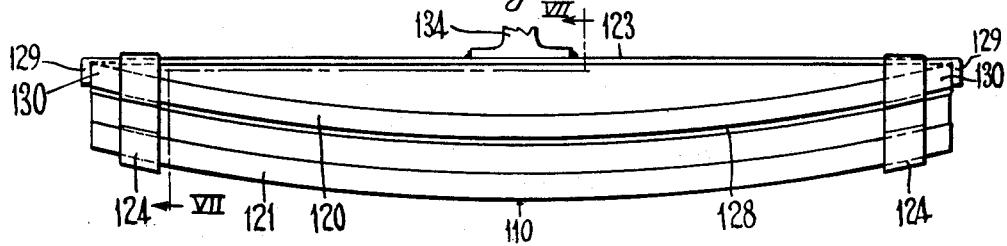
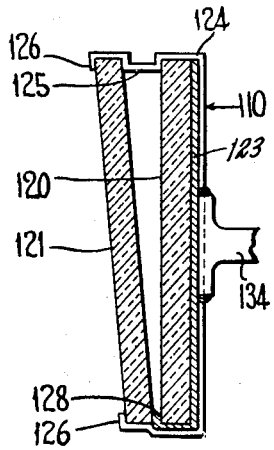
Inventor
JAMES H. SHERTS
By Olen E. Bee
Attorney Patented Dec. 7, 1948

2,455,818

UNITED STATES PATENT OFFICE 2,455,818

GLARE REDUCING REAR-VISION MIRROR

James Hervey Sherts, Pittsburgh, Pa., assignor to Pittsburgh Plate Glass Company, Allegheny County, Pa., a corporation of Pennsylvania Application March 6, 1945, Serial No. 581,218

5 Claims. (Cl. 88—77)

This invention relates to rear vision mirrors and it has particular relation to a combination of reflecting plates adapted to produce selective reflections of different degrees of intensity and over a relatively large field of vision.

One object of the invention is to provide an improved rear vision mirror adapted for both night and day driving wherein the brightness of images or light from headlights or sun can be reduced selectively to any desired intensity.

Another object of the invention is to provide an improved image reducing and glare reducing rear vision mirror.

In one form of the invention, a construction is proposed in which a primary mirror is formed with a convex reflecting surface arranged adjacent and at an angle to a secondary transparent reflecting plate of substantially the same curvature as that of the primary mirror. The plate and the mirror are tilted with respect to each other or they are disposed at a slight angle, the latter preferably opening upwardly. The curvatures of the plates can be spherical or cylindrical.

Figure 2:
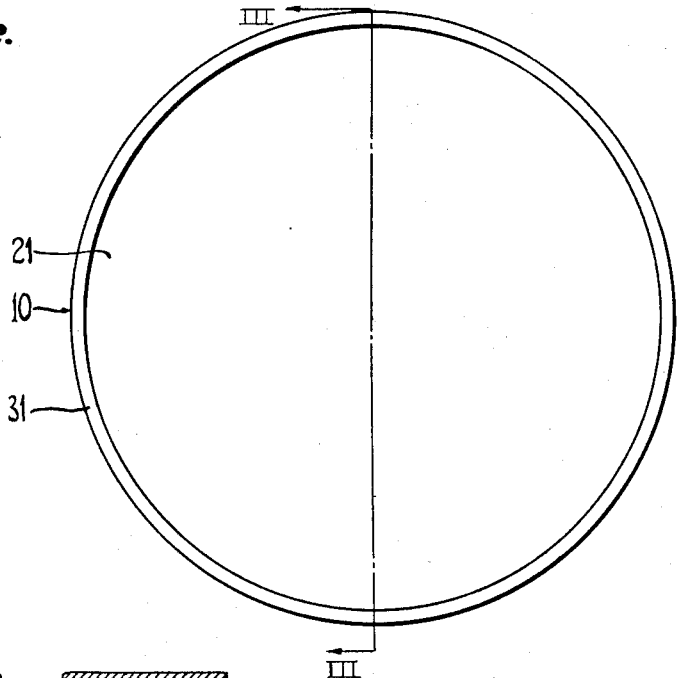
Figure 3:
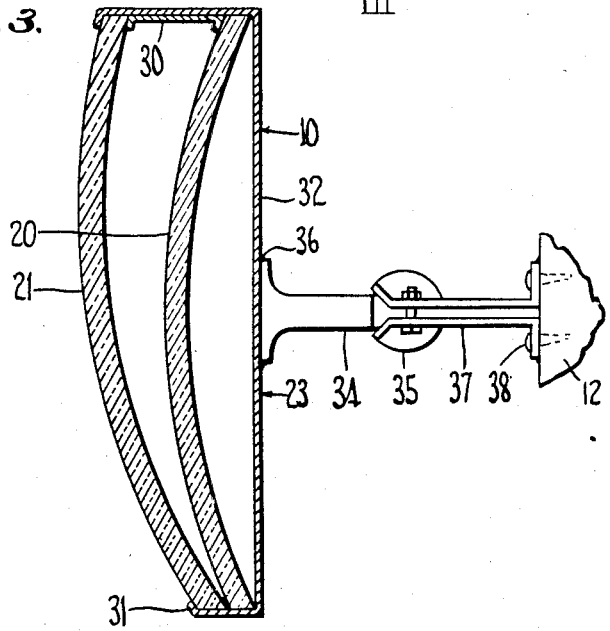

In the drawing, Fig. 1 is a diagramatic fragmentary view of a vehicle with portions thereof shown in cross-section and with a rear vision mirror mounted therein; Fig. 2 is a front elevation, on a larger scale, of a mirror unit in which the invention has been incorporated; Fig. 3 is a vertical section taken substantially along the line III—III of Fig. 2; Fig. 4 is a diagram illustrating positions of rays of light and the manner of reflection in the mirror unit; Fig. 5 is a front elevation of another form of mirror unit; Fig. 6 is a plan of the mirror unit shown in Fig. 5; Fig. 7 is a vertical cross section taken substantially along the line VII—VII of Figure 6; and Fig. 8 is a fragmentary perspective of a mirror supporting frame.

In practicing the invention a rear vision mirror structure 10 is mounted in a vehicle 12 diagrammatically shown in Fig. 1 to indicate the position of the mirror with respect to front and rear windows 13 and 14. The mirror structure includes two superposed reflecting plates 20 and 21 mounted in a frame support 23. The rear plate 20 constitutes a primary mirror and the front plate 21 constitutes a secondary reflector or transparent glass plate, which is tilted or disposed at a slight angle to the rear plate. For convenience in viewing the structure, the lower edges of the plates are disposed quite close together and the upper edges thereof are spread a suitable distance. For convenience, these reflecting plates are shown to be circular and their reflecting surfaces are spherical and convex. Likewise the frame 23 is circular and is provided with a spacer ring 30 disposed between the plates to position them in their properly spaced relation. This frame is composed of relatively thin sheet metal and its front edge has a lip 31 turned to overlap the peripheral edge of the front plate 21.

The frame 23 has a rear wall 32 upon which an arm 34 of a universal joint 35 is rigidly connected, as indicated at 36. Another arm 37 of the joint 35 is rigidly connected, as indicated at 38, upon the vehicle and above the front window or windshield 13.

In using a mirror assembly of this kind, glare from bright lights, or the like, can be reduced by adjusting the unit in such a manner as to bring into the line of vision the images of lower intensity resulting from inter reflections which occur between the convex mirror 20 and the transparent plate 21. The images of lower intensity are brought into view by rotating or pivoting the whole assembly through definite steps about the universal joint 35. By making the front plate 21 curved with a radius of curvature equal to that of the convex mirror 20 and with its concave side toward the convex surface of the latter mirror, a constant image size can be maintained throughout all reflection orders. In this arrangement the images of the various reflection orders are successively brought into view along a given line of vision by rotating the mirror assembly through steps equal to the angle subtended by the mirror and the curved glass plate.

Assuming that the mirror 20 has a reflection coefficient of 87 percent, the intensities of the zero, first, second, and third order images will be approximately 71.8 per cent, 4.9 per cent, 0.34 per cent and 0.026 per cent, respectively, of the intensity of the incident light. The regular separation of the various reflections orders would increase by employing a larger radius of curvature of the members of the mirror assembly or with a larger angle subtended by them.

Referring to the diagrammatic illustration of Fig. 4 in which the glass plate 21 is placed at an angle with respect to the chord ST of the convex mirror 20, the most intense image will be that which is produced by light which strikes the surface of the convex mirror 20 only once. It is represented in the figure by a ray which strikes the mirror at A and is reflected back along itself to the point of observation P. It will be referred to here as the zero order of reflection. The image next in intensity, the first order image, undergoes two reflections at the mirror surface and emerges from the point C on the mirror at such an angle that it also passes through the point P. The second order image, which is next in intensity, undergoes three reflections at the mirror and emerges from F on the mirror at such an angle that it passes through P. The third and fourth order images involve four and five reflections from the convex mirror. In order that both the zero and first order images of a distant object can be seen at P, while the mirror assembly is in the position shown in Fig. 4, incident light must, upon passing through the glass plate, strike the mirror 20 at some point B. From B it is reflected back to the glass plate 21 at I where most of it is transmitted in such a direction that it does not reach P and therefore is not observed. However, a small portion of the light incident at I is reflected back to the mirror at C and thence it is again returned to the glass plate where most of it is transmitted at such an angle that it passes on to the point P. For a given point P and a given radius of curvature R, there is a definite point B on the mirror formation where this relation holds true.

It is to be noted that the reflecting plates 20 and 21 are drawn about the same radius of curvature and disposed at an angle designated, for example, as α. For this unit, the angle α would also increase the angular separation of the successive images to 2α and remain according to this constant separation throughout the higher orders. Thus, by turning the assembly through steps equal to the angle α subtended by the two plates 20 and 21, images of decreasing intensity and of equal size are brought into coincidence with a given line of vision. The images are thus easily isolated in the mirror.

The constant image size throughout the various orders is explained by the fact that in this case the zero order image acts as the object for a visual image produced by reflection from the concave side of the front glass plate 21 which is just the reverse of the zero order image formation. For, since the zero order image is within the principal focus (R/2) of the mirror and the members are close together, this image is also within the principal focus of the concave surface of the front plate 21. Thus, the image produced by reflection from this concave surface will be approximately back at the original position of the object, since the curvature of the glass plate 21 is the same as that of the mirror 20. This image will be the same size as the original object and will be virtual, which means that it will be erect. This virtual image in turn acts as the object for the first order image formed in the mirror, and since its object distance involved is the same as that of the original object it follows that the magnification will be the same as in the case of the zero order image formation. Thus, the zero and first order images will be the same size. This process repeats for higher order images which means that all images formed in the mirror are of the same size.

In Figs. 5 to 8 a mirror structure 110 is shown in which reflecting plates 120 and 121 are mounted in a supporting frame 123 which is provided with demountable clips 124 composed of resilient metal strips adapted to embrace the end portions of the rear mirror plate 120 and to receive in yieldably clamped relation the end portions of the transparent reflecting plate 121 in such manner that the latter is set at an angle to the rear plate. Each clip is formed with an offset upper portion 125 which spaces the upper portions of the plates 120 and 121, and upper and lower lips 126 on the clips cooperate with the spacing portions 125 to hold the plates in properly assembled relation. These reflecting plates 120 and 121 are cylindrical or in the form of similar segments of cylinders and are normally disposed upright but at an angle to each other. In this arrangement the field of vision within which the reflected image can appear is considerably enlarged laterally or horizontally, although such image will be somewhat distorted. Also, in this type of unit the clips 124 and the front reflecting plate 121 can be removed by demounting the clips, and then the rear mirror 120 can be used alone.

As shown in Fig. 8, the lower portion of the frame 123 has an upwardly turned lip 128 and side flanges 129 for embracing the rear plate 120. Also, ears 130 at the end portions of the frame can be bent down over the edges of the plate 120 to prevent displacement of the latter from the frame. The lower edge of the front plate 121 is set between the lower clip lips 126 and the frame lip 128.

It is to be understood that the front reflecting plate 121 is demountable by removing the clips 124 and that the latter are sprung into position to clamp the plate 121 in properly assembled relation to the other plate 120. If desired, the rear mirror plate 120 can be used alone as a rear vision mirror.

The frame 123 is provided with a mounting arm 134 rigidly secured thereto for connection to the vehicle 12 in the same manner as the arm 34 (Fig. 3) is connected.

Although illustrative forms of the invention have been shown and described in detail, it will be apparent to those skilled in the art that the invention is not so limited, but that various changes can be made therein without distinguishing from the spirit of the invention or from the scope of the appended claims.

I claim:

1. In a rear vision mirror structure having upper and lower edge portions, a primary back mirror having a curved convex reflecting surface, a transparent reflecting plate having the same curvature as the reflecting mirror surface, the convex surface of the mirror facing the concave surface of the plate and a frame securing the lower edge portion of the mirror and plate closely adjacent to each other and securing the upper portions of said mirror and plate in spaced relation to maintain the plate disposed angularly to the mirror.

2. In a rear vision mirror structure having upper and lower edge portions, a primary convex back mirror curving from its upper portion to its lower portion, a transparent reflecting plate curving from its upper portion to its lower portion correspondingly to the curving of the back mirror, the convex surface of the mirror facing the concave surface of the plate and a frame securing the lower edge portions of the mirror and plate in adjacent relation and securing the upper portions of the said mirror and plate spaced a greater distance than the lower portions thereof to maintain the plate disposed angularly to the mirror.

3. In a rear vision mirror structure, a primary back mirror having a convex spherical reflecting surface facing rearwardly with respect to the lines of vision directed toward it, a polished transparent glass plate having the same convex spherical curvature as said reflecting surface and superposed in tilted relation thereto, said plate facing rearwardly in the same sense as the mirror, means connecting said mirror and plate and holding them in the tilted relation specified, and a support pivotally mounting said mirror and plate as a unit.

4. In a rear vision mirror structure, a primary back mirror having a convex cylindrical reflecting surface, a polished transparent glass plate of the same cylindrical curvature as said reflecting surface and superposed in tilted relation thereto in a position to present corresponding chords of the respective cylindrical curvatures at acute angles to one another, the convex surfaces of the mirror and plate facing rearwardly with respect to lines of vision directed thereto, means for connecting the mirror and plate and holding them rigidly in the tilted relation specified, and a support pivotally mounting the mirror and plate as a unit.

5. In a rear vision mirror structure, two reflecting plates, one of said plates including a cylindrical mirrored surface having an upright axis, the other plate being of transparent glass and having the same cylindrical curvature as said mirrored surface, the convex surface of the cylindrical mirror facing the concave surface of the cylindrical plate, the axis of the cylindrical transparent plate being disposed at an acute angle to the axis of the cylindrical mirrored surface to space the upper edges of the plate a greater distance than the lower edges thereof, means for connecting said plates and holding them rigidly in the relation specified, and a support pivotally mounting said plates as a unit.

JAMES HERVEY SHERTS.

REFERENCES CITED

The following references are of record in the file of this patent:

UNITED STATES PATENTS

| Number | Name | Date |
|---|---|---|
| 1,007,346 | Fery | Oct. 31, 1911 |
| 1,305,984 | Becker | June 3, 1919 |
| 1,539,579 | Kucharski | May 26, 1925 |
| 1,709,752 | Solenberger | Apr. 16, 1929 |
| 1,808,740 | Wetherbee | June 2, 1931 |
| 2,166,102 | Wild | July 18, 1939 |
| 2,323,005 | Bertele | June 29, 1943 |
| 2,327,802 | Kelly | Aug. 24, 1943 |
| 2,362,611 | Brown | Nov. 14, 1944 |
| 2,397,947 | Colbert | Apr. 9, 1946 |

FOREIGN PATENTS

| Number | Country | Date |
|---|---|---|
| 362,622 | Great Britain | Dec. 10, 1931 |
| 723,506 | France | Jan. 18, 1932 |